March 28, 1961   H. STANSFIELD ET AL   2,976,973
TORQUE CONVERTER

Filed Feb. 12, 1957   2 Sheets-Sheet 1

INVENTORS.
Hamill Stansfield
BY James Edge

Carlson, Pitzner, Hubbard & Wolfe
Attys.

March 28, 1961 — H. STANSFIELD ET AL — 2,976,973
TORQUE CONVERTER
Filed Feb. 12, 1957 — 2 Sheets-Sheet 2
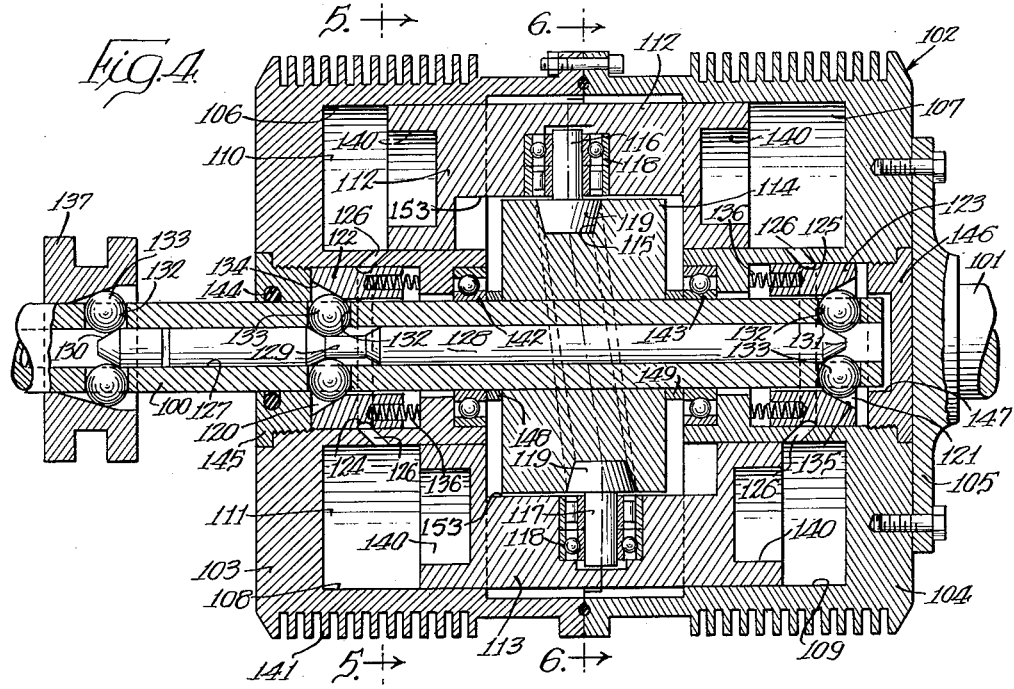
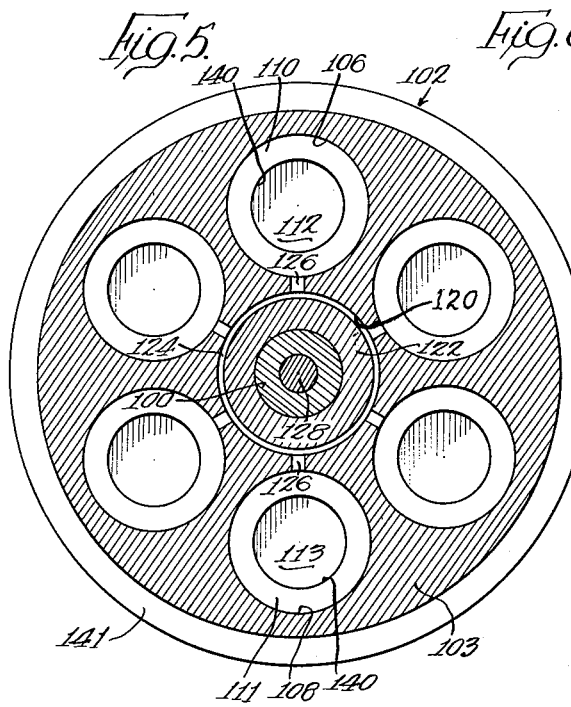
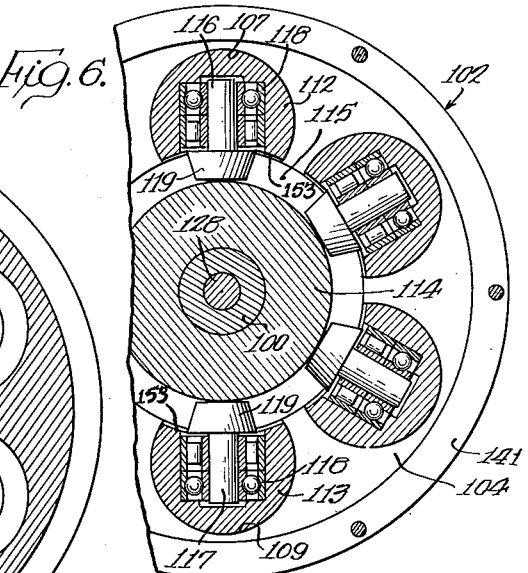
INVENTORS.
Hamill Stansfield
BY James Edge
Carlson, Pitzner, Hubbard & Wolfe
Attys.

United States Patent Office 2,976,973
Patented Mar. 28, 1961

2,976,973

TORQUE CONVERTER

Hamill Stansfield and James Edge, Allentown, Pa., assignors to Carney-Stansfield Co., a corporation of Pennsylvania Filed Feb. 12, 1957, Ser. No. 639,805

6 Claims. (Cl. 192—59)

The present invention relates generally to a hydraulic transmission for changing speed and converting torque and is useful, as for example, in vehicles, machine tools, and the like.

It is a general object of the present invention to provide a transmission characterized by means for automatically declutching the driving and driven members thereof at idle speeds, means for effecting driving relation therebetween smoothly and gradually as the speed of the driving member increases, and means for effecting a direct lock between the driving and driven members at high speeds to provide a direct driving coupling therebetween.

It is a more detailed object of this invention to provide a transmission in which a piston type fluid pump is employed housed in a transmission casing which is coupled for rotation with the driven member and for relative rotation with respect to the driving member, the fluid pump acting to circulate fluid within a closed fluid path within the casing incident to such relative rotation.

It is a still further object to provide means for restricting the circulation of fluid within the transmission casing so that torque is developed to turn the transmission casing and driven member upon the achievement of a particular relation between the speed of the driving member and the load imposed on the driven member.

It is another object to provide means for adjusting the restriction of circulation of fluid within the transmission casing, to vary the output power and torque characteristics of the transmission.

The objects of the invention thus generally set forth together with other objects and ancillary advantages are obtained by the construction and arrangement shown by way of illustration in the accompanying drawings in which:

Fig. 4 is a cross-sectional view of a fluid transmission embodying a modified form of the present invention;

Fig. 5 is a cross-sectional view taken substantially in the plane of lines 5—5 of Fig. 4;

Fig. 6 is a fragmentary sectional view taken substantially in the plane of lines 6—6 of Fig. 4.

Figure 1:
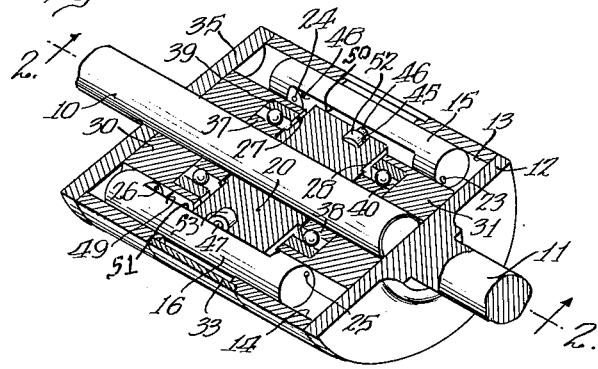
Figure 1 is a perspective view with a portion cut away of a fluid transmission embodying one illustrative form of the present invention.

While the invention is susceptible of various modifications and alternative constructions, there is shown in the drawings and will be herein described in detail, two illustrative embodiments. It is to be understood, however, that it is not hereby intended to limit the invention to the specific forms disclosed. In fact, it is intended to cover all modifications, alternative constructions and equivalents falling within the spirit and scope of the invention as expressed in the claims.

Referring more particularly to the drawings, the form of the invention there shown for purposes of illustration is embodied in a hydraulic transmission having a driving shaft 10, a driven shaft 11, and means for coupling the driving shaft and driven shaft together.

In the present instance, the coupling means includes a rotatable transmission casing 12 connected to the driven shaft 11 for rotation therewith. The drive shaft is rotatably journaled centrally in the transmission casing 12, and is mounted for rotation relative to the casing.

In accordance with one aspect of the present invention, as illustrated in Fig. 1, there is provided a piston type fluid pump within the transmission casing 12. Thus the transmission casing 12 includes a plurality of circumferentially spaced, axially disposed cylinders (Figs. 1–3), 13, 14, each adapted to receive a single piston 15, 16. To reciprocate the pistons as an incident to relative rotation between the driving shaft 10 and transmission casing 12, intermediately of the driving shaft 10 a barrel cam 20 is provided, splined or otherwise fastened for rotation with the driving shaft 10 and connected to impart motion to the respective pistons.

The cylinders 13, 14 in which the pistons 15, 16 operate, are interconnected through a porting arrangement so as to provide for continuous flow of fluid confined in said cylinders and circulation within the transmission casing upon reciprocation of the pistons. In the present instance (Figs. 1–3), the communication between the cylinders, forming a closed fluid path within the transmission casing, is provided by passages in each of the pistons and annular relief grooves in the region of and adjacent the barrel cam 20. One suitable porting arrangement is shown in Fig. 1, where each piston 15, 16 is drilled at both ends to provide passages therein, 23, 24 and 25, 26 respectively. The vertical opposed surfaces of the barrel cam 20 are also both machined to form annular relief grooves 27, 28 communicating with the passages in the pistons. Upon reciprocation of the pistons, the pistons force or pump fluid confined within the cylinders, to and from the annular relief grooves 27, 28 adjacent the barrel cam 20 and between the cylinders.

In the construction and arrangement illustrated, the transmission casing 12 is formed integral with the driven shaft 11, which is mounted in axial alignment with the driving shaft 10. The transmission casing 12 is formed of cylinder barrels 30, 31 connected in a fixed spaced relation by means of a ring 33, shown in Fig. 2 in lapped relation with the opposite facing internal surfaces of the cylinder barrel members 30, 31. A head plate 35 fastened to the outer surface of the barrel member 30 on the driving shaft end of the transmission casing serves to close the casing and seal the cylinders. To accommodate the driving shaft 10, the transmission casing 12 is bored centrally through the head plate 35, barrels 30, 31 and barrel cam 20, and the driving shaft is journaled therein supported for rotation by bearings 37, 38 pressed into place in recesses 39, 40, formed in the internal facing surfaces of the barrel members 30, 31.

Figure 2:
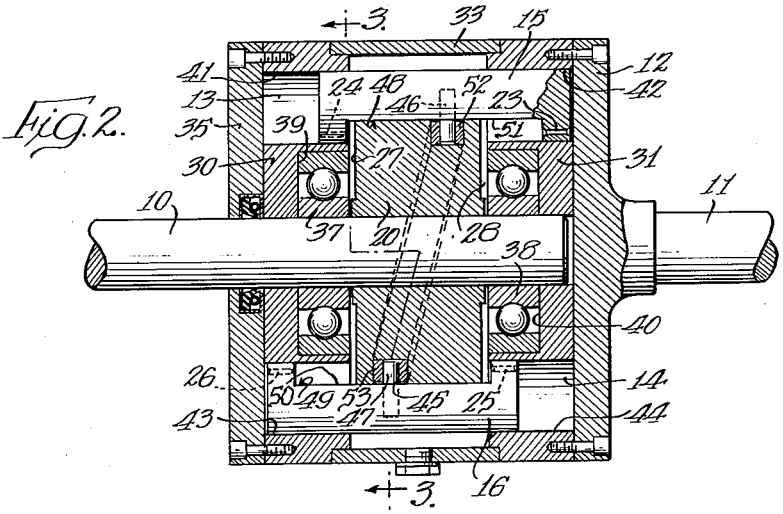
Fig. 2 is a cross-sectional view taken substantially in the plane of lines 2—2 of Fig. 1.

Referring now to Fig. 2, the pistons 15, 16 and cylinders 13, 14 are there shown in a balanced arrangement. The cylinders 13, 14 are formed by pairs of opposed cylinder bores 41, 42 and 43, 44, circumferentially disposed radially equi-distant from the axis of the transmission casing 12 in the cylinder barrels 30, 31. Each pair of oppositely disposed cylinder bores forms a cylinder to receive a piston, the number of pistons corresponding in number to the bores in a single barrel. Both ends of each piston are utilized, and the pistons are accordingly double acting, the surfaces of the pistons and corresponding bore surfaces being machined smooth to a clearance sufficient to prevent leakage of fluid between the piston and the cylinder bore wall.

As stated hereinbefore, means are provided for reciprocating the pistons in the cylinders incident to relative rotation between the driving shaft 10 and the transmission casing 12. In the illustrative form of the invention depicted in Figs. 1–3, said means includes a cam track 45, on the peripheral surface of the barrel cam 20 arranged for coaction with follower pins 46, 47 depending from each of the pistons 15, 16 intermediate the ends thereof.

Figure 3:
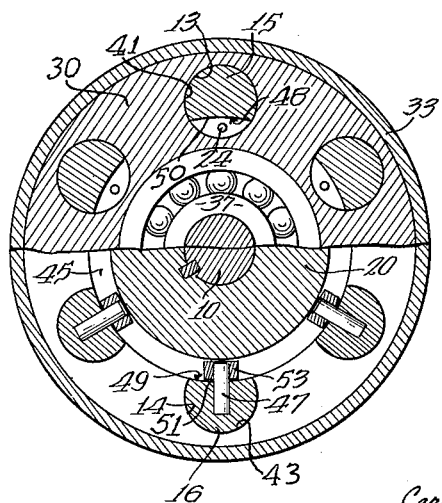
Fig. 3 is a cross-sectional view taken in offset planes shown as lines 3—3 of Fig. 2.

Also shown in the construction and arrangement illustrated in Figs. 1–3, and employed in order to prevent the rotation of the pistons in the cylinders and to permit their nesting around the barrel cam 20, segmental portions 48, 49 are removed intermediate the ends of the pistons 15, 16 to provide a recessed surface 50, 51. The follower pins 46, 47 are inserted in the center of the surface of the segmental cutout portions 48, 49, removed from the piston 15, 16. With this arrangement the peripheral surface of the barrel cam 20 rides against the surface 50, 51 of the cutout portions in the respective pistons, as shown in Fig. 3. The length of the segmental cutout portions 48, 49 need only be sufficient to permit the full stroke travel of the pistons during their reciprocation, and must be deep enough to permit the nesting of the pistons around the barrel cam without causing them to bind thereto and to interfere with the action of the pistons. Bushings 52, 53 mounted on the ends of the follower pins 46, 47 and riding in the cam track 45 formed on the peripheral surface of the barrel cam 20, are rotatable to reduce the friction between the pins and the cam track and increase the efficiency of the assembly.

The hydraulic transmission shown in Figs. 1–3, thus comprises driving and driven shafts 10, 11 respectively, connected by means of a unit including a plurality of pistons disposed in circumferentially arranged cylinders in a transmission casing. Means are also provided forming a closed fluid path within the transmission casing, and also providing communication between the respective cylinders within the casing.

In the operation of this transmission, the transmission casing 12 is filled with a suitable fluid such as transmission oil, which then is contained in the cylinders 13, 14 and in the annular relief grooves 27, 28. Upon rotation of the driveshaft 10, and relative rotation between the driveshaft and the transmission casing 12, the pistons 15, 16 disposed in each of the cylinders are caused to reciprocate and oil is transferred between the cylinders and circulated within the transmission casing. As the speed of the driving shaft 10 increases, and the rate of reciprocation of the pistons increases, the volume of fluid circulated within the transmission casing, through the passages 23, 24 and 25, 26 in the ends of the pistons and in the annular relief grooves or space adjacent the barrel cam, correspondingly increases. A point is soon reached upon increase in the speed of the driving shaft, where by reason of the restriction to fluid flow offered by the passages through the ends of the pistons, torque is developed tending to rotate the transmission casing with the driveshaft.

With no load on the driven shaft, the transmission casing remains stationary until the rate of rotation of the driving shaft with respect thereto is sufficient to overcome the resistance to rotation of the transmission body and driven shaft. Upon the achievement of a predetermined differential in relative speed between the driving shaft and the transmission casing, the transmission casing thus begins to turn. This differential is established by factors including the diameter of the passages in the ends of the pistons, the width of the relief grooves adjacent the barrel cam and the interior surfaces of the barrel members, the viscosity of the fluid employed, and the amount of friction involved in the movement of the various parts of the assembly.

With load applied to the driven shaft, a similar action takes place. Initially, rotation of the driving shaft causes relative rotation between the driving shaft and the transmission casing and the transmission casing and driven shaft remain at a standstill. Upon further increase in speed of the driving shaft and until a predetermined differential is reached, the transmission casing and driven shaft remain stationary. When a predetermined differential in speed is achieved the driven shaft coupled to the load begins to turn with the driving shaft, the transition between rest and movement of the driven shaft being gradual and uniform due to the inherent nature of the fluid coupling between the driving and driven members.

In Figs. 4–6, a further illustrative form of the invention is shown. As in the previous instance, the transmission there shown includes a driving shaft 100, a driven shaft 101, coupled by means including a transmission casing 102. In this illustrative form, the transmission casing 102 is made in two parts or cylinder barrels, 103, 104 respectively, one part or barrel 103 having a central bore in which the driving shaft 100 is journaled, and the second part or barrel 104 being bolted to a flanged end plate 105 mounted on the driven shaft 101. Each of the parts or barrels 103, 104 is drilled with a plurality of circumferentially spaced, axially disposed cylinder bores 106, 107, and 108, 109, the cylinder bores in each part of the transmission casing being axially aligned so as to form cylinders 110, 111 to receive pistons 112, 113, each pair of aligned bores 106, 108 and 107, 109 receiving a single piston. An even number of these cylinder pairs are disposed in circumferentially spaced relationship around the driving shaft 100. This disposition of the pistons and cylinders results in opposing forces of equal magnitude on diametrically opposite pistons, so that the axial forces are balanced, thereby eliminating axial thrust on the shaft.

Each of said pistons 112, 113 is double acting and is mounted for reciprocation in the transmission casing 102 incident to rotation of the driveshaft 100 relative to the casing.

In the present instance, the driveshaft 100 carries a barrel cam 114 having a cam track 115 disposed on the peripheral surface thereof. Each of the pistons 112, 113 is provided with a follower pin 116, 117 respectively, mounted in the piston by means of bearings 118 and provided with a tapered end portion 119 for riding in the groove 115 in the barrel cam. The follower pins 116, 117 operate as cam followers, the end portions thereof being tapered so that the peripheral speed varies as the diameter increases, and matches the surface speed of the side walls of the cam groove formed in the surface of the barrel cam. The provision of a tapered surface on the end portions of the pins 116, 117 and a similar tapered cross-section for the groove in the peripheral surface of the barrel cam, producing a match between the surface speed of the barrel cam and the surface speed of the cam follower, reduces wear and provides a more efficient assembly.

Within the transmission casing 102, a closed fluid path between the cylinder bores is provided by passages providing communication between the cylinders. In the present instance, each of the two parts or barrels 103, 104 making up the transmission casing 102 are provided with annular cavities 120, 121 of limited axial and radial extent, surrounding the driveshaft 100. In each of the cavities 120, 121 there is disposed a slidable plug 122, 123 respectively, each having an annular groove 124, 125, extending completely around the peripheral surface thereof. Communication between the cylinders 110, 111 is provided by a series of radial passages 126 communicating with the cylinders and, in the position of the parts of the assembly shown in Fig. 4, with the annular grooves in the peripheral surface of each of the plugs 122, 123. The passages and grooves form with the cylinders a closed fluid path through which fluid contained in the cylinders may be circulated upon reciprocation of the pistons incident to relative rotation between the driving shaft 100 and the transmission casing 102.

In the arrangement and construction illustrated in Figs. 4–6, means are also provided to vary the extent of restriction of communication between the cylinders. As shown in Fig. 4, the plugs 122, 123 are shiftable axially by an external, manually or automatically operated means to vary the extent of registration between the annular grooves 124, 125 and the passages 126. Accordingly, driving shaft 100 is formed hollow, with a central longitudinal bore extending therethrough. Within the bore 127 is a plunger or control rod 128 having intermediate the ends thereof a portion 129 of reduced diameter, and formed at each end with a tapered section 130, 131 of gradually reduced cross-section. Contiguous to the portion 129 of reduced diameter of the plunger 128, and the end portions 130, 131 thereof, the walls of the hollow shaft 100 are slotted 132, to accommodate balls 133.

The ends of the plugs 122, 123 which face outwardly, are champered or bevelled 134, 135 along the inner surface thereof, to bear against the balls 133 resting in the slots 132 and are adapted to cooperate therewith such that upon outward movement of the balls, the plugs 122, 123 are caused to slide inwardly toward the central part of the transmission casing, against the action of springs 136 biasing the plugs outwardly along the shaft.

In the construction and arrangement shown in Figs. 4–6, means are provided for adjusting the restriction of communication between the cylinders within the transmission casing itself. As shown, this means includes a plunger or control rod, slidably mounted in the central longitudinal bore within the hollow driveshaft 100. This control member or plunger, is reciprocable axially of the hollow shaft 100 by means of a thrust ring 137, supported about the driveshaft 100 for relative movement. The inner surface thereof is also tapered for coaction with balls 133 contained within slots 132 in the wall of the hollow driveshaft 100, such that axial movement of the thrust ring 137 results in corresponding axial movement of the control rod or plunger contained within the driveshaft. Each of the array of balls may comprise a symmetrical arrangement of a plurality of balls, two or more spaced equidistantly about the driveshaft 101 as desired.

Thus by external action, either through manually operated or automatically operated means, the control rod or plunger 128 may be moved axially and the plugs 122, 123 moved in correspondence therewith. Such movement of the thrust ring, control rod, and balls, results in movement of the plugs to remove from registration the annular grooves in the plugs and the radial passages communicating between the annular grooves and the cylinders. Upon gradual movement of the thrust ring and control rod, the annular grooves each are gradually moved out of registration with the mouths of the radial passages, and the extent of communication between the cylinders is gradually reduced, until a point is reached when the annular grooves and radial passages are completely out of registration, when communication between the cylinders is completely interrupted.

To operate the transmission shown in Figs. 4–6, the transmission casing, as in the case of the illustrative embodiment of the invention previously described in connection with Figs. 1–3, is first filled with a suitable fluid such as transmission oil. With no load on the driven shaft 101, and the driving shaft 100 rotating at low speed, the pistons 112, 113 are caused to reciprocate in their respective cylinders 110, 111 formed in the transmission casing 102, and in the position of the parts making up the assembly as shown in Fig. 4, oil is circulated through the passages 126, annular grooves 124, 125 in the plugs 122, 123, between the cylinders and in a closed fluid path formed within the transmission casing. The pistons are bored at each end 140, to increase the volume of fluid which may be contained within the cylinders adjacent the ends of the pistons. This also produces better cooling due to the increased volume of fluid contained within the transmission casing, and cooling is further improved by providing fins 141 on the outside peripheral walls of the transmission casing 102. It may be necessary or advisable in certain applications, to include other cooling means in connection with the transmission, however, in most applications the specific features illustrated provide for adequate cooling, and smooth efficient operation of the transmission.

In order to increase the efficiency of the unit, the hollow driveshaft 100 centrally journaled within the transmission casing 102, may be supported in bearings 142, 143 pressed into place within recesses formed in the interior of the parts 103, 104, making up the transmission casing. Leakage of transmission fluid from the transmission casing may be prevented by an O-ring 144 surrounding the driveshaft 100, and seated in annular plug 145 which is machined to fit closely about the driveshaft and threaded into place in the drive shaft end of the casing.

The plug 145 when in place forms a stop to locate the control rod assembly with the peripheral annular grooves in the members 122, 123 in registration with the radial passages 126 which communicate with the cylinders. At the other end of the transmission casing, a plug 146 is provided threaded in place within the casing having a recess 147 provided to clear the end of the driveshaft 100. The plug 146 forms a stop to limit the extent of axial movement of the control rod assembly in a direction to remove the annular grooves from registration with the radial passages in the casing. The plugs 145 and 146 thus also provide means for adjusting the control rod assembly for optimum performance, by permitting adjustment of the extent of axial movement permitted of this assembly in the casing.

To prevent axial movement of the driveshaft 100 within the transmission casing, thrust washers 148, 149 are provided encircling the driveshaft and adjacent the ends of the barrel cam 114, serving as spacers to position the barrel cam intermediately of the transmission casing. Thus the thrust washers bear against the barrel cam and also against the inner race of bearings 142, 143, supported within the transmission casing and in which the hollow driveshaft 100 is journaled.

In order to prevent the rotation of the pistons 112, 113 in the cylinders, and to permit their nesting around the cam 114, as in the instance of the invention illustrated in Figs. 1–3, segmental portions are removed intermediate the ends of the pistons to provide recessed surfaces 153. The follower pins 116, 117 are inserted into the pistons in the center of the surface of the segmental cutout portions. With this arrangement the peripheral surface of the barrel cam 114 rides closely against the surface of the cutout portion of the respective pistons as shown in Fig. 6. The amount of material longitudinally removed from the piston need only be sufficient to permit the full stroke travel of the pistons during their reciprocation, and must be deep enough to permit the nesting of the pistons around the barrel cam without causing them to bind or interfere with the action thereof.

As hereinbefore described, the transmission system of Figs. 4–6 operates so that upon low speed of the driving shaft 100, and relative rotation between said driving shaft and the transmission casing 102, the pistons contained within the transmission casing are caused to reciprocate and circulate fluid in a closed fluid path within the transmission casing. As the speed of the driving shaft increases, however, the communication between the cylinders being restricted, even with the plugs 122, 123 positioned as shown, torque is developed to cause the transmission casing and driven member to turn in step with the driving member. The differential in speed between the members and thus the speed of the driving member at which the driven member and transmission casing begin rotation, depends upon a number of factors including the extent of restriction between the cylinders, the friction generated within the apparatus, and the viscosity of the fluid employed.

Another factor which is brought into effect as the speed of the driving shaft increases is due to centrifugal force acting on the fluid contained within the transmission casing. This would be experienced with both forms of the invention illustrated. As the speed of rotation of the transmission increases, centrifugal force causes the fluid contained within the transmission casing to become more difficult to move in a direction angularly disposed to the direction of centrifugal force. Thus, at high speeds of rotation the resistance to piston movement increases and as the transmission casing turns in step with the driving shaft the differential in speed between the transmission casing and the driving shaft is gradually reduced. Upon reaching the minimum speed at which this effect is realized, the transmission casing and driven shaft can be considered to be locked in step with the driving shaft and turning at a speed determined by the operating characteristics of the unit. The action due to centrifugal force produces a gradual reduction toward zero of the differential of speed between the driving and driven members as the speed of the driving shaft (and thus the transmission casing and driven shaft) increases, and a gradual increase toward unity of the speed ratio between the members.

To obtain a direct drive between the driving shaft and transmission casing in the arrangement of Figs. 4–6, communication between the cylinders within the transmission casing may be completely interrupted by means of the thrust ring and plunger assembly. Complete interruption of communication results in trapping the fluid within the cylinders and prevents reciprocation of the pistons. The rotary motion of the driveshaft, therefore, is transmitted directly through the locked pistons to the transmission casing and hence to the driven shaft. By shifting the thrust ring toward the right in Fig. 4, sufficient to cause such interruption, the driving and driven shafts may be directly coupled together.

By shifting the thrust ring only partially, the restriction to communication may be increased and the driven shaft caused to turn at a smaller differential in speed relative to the driveshaft, producing a speed ratio approaching unity depending upon the extent of communication.

The thrust ring may be operated manually, or automatically by means responsive to vehicle speed, for example, where the transmission of this invention is employed to drive a vehicle. The restriction to communication may be varied by such means so that at idling speeds of the vehicle engine the driving and driven shafts are effectively declutched, at intermediate speeds the driving shaft turns the driven shaft with a differential in speed varying in accordance withe the vehicle speed, while at high speeds the driving and driven shafts may be coupled in a direct drive relation for obtaining maximum efficiency in gas consumption and minimum slip.

In each of the foregoing illustrations of the invention, a particular form and arrangement of parts is shown and illustrated. It is not to be construed, however, that the invention is to be limited thereto, but it is intended to embrace all alternative constructions within the spirit and scope of the appended claims.

We claim as our invention:

1. In a hydraulic transmission, the combination comprising a rotatable outer casing, a driveshaft rotatably journaled in said casing, a driven shaft non-rotatably fixed on said casing, a plurality of pairs of aligned cylinders arranged in said casing in circumferentially spaced relation about said driveshaft and having chambers adjacent the ends thereof, double acting pistons reciprocably mounted in each pair of cylinders and acting on fluid in said chambers, means for reciprocating said pistons incident to relative rotation between said casing and said driveshaft, means at each end of the casing defining a restricted annular passage radially inward of the cylinders and surrounding the driveshaft, and means defining uninterrupted passages of small cross section connecting the chambers at the ends of each cylinder with the adjacent annular passage providing for flow through said uninterrupted passages in either direction to and from the chambers so that said pistons are restrained against movement upon rotation of the driveshaft by the restricted circulation of fluid between said chambers developing torque to turn the driven shaft.

2. In a hydraulic transmission, the combination comprising a rotatable casing, a driveshaft rotatably journaled centrally in said casing, a driven shaft coupled to said casing for rotation therewith, a plurality of pairs of aligned cylinders arranged in said casing in circumferentially spaced relation about said driveshaft and having chambers adjacent the ends thereof, double acting pistons reciprocably mounted in each of said pairs of cylinders, each piston having an end portion slidable within the respective cylinder and acting on fluid in the respective chamber, a barrel cam mounted on said driveshaft intermediate the ends of said cylinders, means connecting said barrel cam to said pistons for reciprocating said pistons incident to rotation of said barrel cam relative to the casing, means adjacent each end of the barrel cam defining a restricted annular passage radially inward of the cylinders and surrounding the driveshaft, and means defining uninterrupted passages of small cross section connecting the chambers at the ends of each cylinder with the adjacent annular passage providing for flow through said uninterrupted passages in either direction to and from the chambers so that said pistons are restrained against movement upon rotation of the driveshaft by the restricted circulation of fluid between said chambers developing torque to turn the driven shaft.

3. In a hydraulic transmission, the combination comprising a rotatable outer casing, a hollow driveshaft rotatably journaled in said casing, means for coupling a driven shaft to said casing for rotation therewith, a plurality of cylinders arranged in said casing in circumferentially spaced relation about said driveshaft and having chambers adjacent the ends thereof, double acting pistons reciprocably mounted in each of said cylinders and acting on fluid in said chambers, means for reciprocating said pistons incident to rotation of said driveshaft relative to the casing, said casing having an annular portion inward of the cylinders surrounding the driveshaft at each end of the casing and defining a bore therebetween, means connecting the cylinder chambers with the bore at the same end of the casing including an uninterrupted passage of small cross section in said casing connecting each chamber with a port in the wall of said bore, a valve sleeve slidably received in each bore and having a peripheral groove defining a restricted annular passage facing said wall and registering with the ports in said wall to provide for flow in either direction through the uninterrupted passages to and from the cylinder chambers so that upon rotation of the driveshaft said pistons are restrained against movement by the restricted circulation of fluid between the chambers developing torque to turn the driven shaft, and means for adjusting the flow between said chambers to control the torque applied to turn the driven shaft including a control rod slidably mounted in the hollow driveshaft, said shaft having radial openings adjacent said bores respectively, camming portions carried by said control rod adjacent said openings, operating members extending through said openings and bearing against said sleeve valves, said operating members coacting with said camming portions such that movement of the control rod is translated into movement of the sleeve valves to vary the extent of registration between said groove and said ports.

4. In a hydraulic transmission, the combination comprising a rotatable outer casing, a hollow driveshaft rotatably journaled in said casing, means for coupling a driven shaft to said casing for rotation therewith, a plurality of cylinders arranged in said casing in circumferentially spaced relation about said driveshaft and having chambers adjacent the ends thereof, double acting pistons reciprocably mounted in each of said cylinders and acting on fluid in the respective chambers, means for reciprocating said pistons incident to rotation of said driveshaft relative to the casing, means providing restricted communication between said cylinders and forming a fluid path within said casing including an annular portion at each end of said casing surrounding said driveshaft and defining a bore therebetween, means connecting the cylinder chambers with the bore at the same end of the casing including an uninterrupted passage of small cross section in said casing connecting each chamber with a port in the wall of said bore, a valve sleeve slidably received in each bore having a peripheral groove facing said wall defining a restricted annular passage radially inward of the cylinders and registering with the ports therein to provide for flow in either direction through the passages to and from the cylinder chambers so that upon rotation of the driveshaft said pistons are restrained against movement by the restricted circulation of fluid between the chambers developing torque to turn the driven shaft, and means for adjusting the flow between said chambers to control the torque applied to turn the driven shaft including a control rod slidably mounted in the hollow driveshaft, and means actuated by said control rod for moving said valve sleeves to vary the extent of registration between said peripheral groove and said ports.

5. In a hydraulic transmission, the combination comprising a rotatable outer casing, a driveshaft rotatably journaled in said casing, a driven shaft non-rotatably fixed on said casing, a plurality of pairs of alined cylinders arranged in said casing in circumferentially spaced relation about said driveshaft and having chambers adjacent the ends thereof, double acting pistons reciprocably mounted in each pair of cylinders and acting on fluid in said chambers, a barrel cam mounted on said driveshaft axially between the alined cylinders for reciprocating said pistons incident to relative rotation between said casing and said driveshaft, means at each end of the casing axially adjacent the barrel cam defining a restricted annular passage radially adjacent the inner edges of the cylinders, and means including an uninterrupted passage of small cross section extending axially through each end of each of said pistons connecting the cylinder chambers with the annular passage at the same end of the casing providing for flow in either direction to and from the cylinder chambers so that said pistons are restrained against movement upon rotation of the driveshaft by the restricted circulation of fluid between said chambers developing torque to turn the driven shaft.

6. In a hydraulic transmission, the combination comprising a rotatable outer casing, a driveshaft rotatably journaled in said casing, a driven shaft non-rotatably fixed on said casing, a plurality of pairs of aligned cylinders arranged in said casing in circumferentially spaced relation about said driveshaft and having chambers adjacent the ends thereof, double acting pistons reciprocably mounted in each pair of cylinders and acting on fluid in said chambers, means for reciprocating said pistons incident to relative rotation between said casing and said driveshaft, means at each end of the casing defining a restricted annular passage radially inward of the cylinders and surrounding the driveshaft, means defining uninterrupted passages of small cross section connecting the chambers at the ends of each cylinder with the adjacent annular passage providing for flow through said uninterrupted passages in either direction to and from the chambers so that said pistons are restrained against movement upon rotation of the driveshaft by the restricted circulation of fluid between said chambers developing torque to turn the drive shaft, and means for adjusting the flow through said passages between said chambers to control the torque applied to turn the driven shaft.

References Cited in the file of this patent

UNITED STATES PATENTS

| | | |
|---|---|---|
| 970,640 | McClintock | Sept. 20, 1910 |
| 1,787,246 | Greening et al. | Dec. 30, 1930 |
| 1,924,508 | McCarthy | Aug. 29, 1933 |
| 2,215,103 | Holpfer | Sept. 17, 1940 |
| 2,370,640 | Deardorff et al. | Mar. 6, 1945 |
| 2,497,993 | James | Feb. 21, 1950 |
| 2,667,952 | Ainsworth | Feb. 2, 1954 |
| 2,723,739 | Maier | Nov. 15, 1955 |

FOREIGN PATENTS

| | | |
|---|---|---|
| 285,452 | Italy | May 12, 1931 |